United States Patent
Forrister et al.

(10) Patent No.: US 11,891,495 B2
(45) Date of Patent: Feb. 6, 2024

(54) THERMOPLASTIC POLYMER COMPOSITION AND METHOD FOR MAKING ARTICLES AND FILMS FROM THE SAME

(71) Applicant: Milliken & Company, Spartanburg, SC (US)

(72) Inventors: Walter Forrister, Inman, SC (US); Xiaoyou Xu, Spartanburg, SC (US); Darin Dotson, Moore, SC (US)

(73) Assignee: Milliken & Company, Spartanburg, SC (US)

( * ) Notice: Subject to any disclaimer, the term of this patent is extended or adjusted under 35 U.S.C. 154(b) by 158 days.

(21) Appl. No.: 17/386,675

(22) Filed: Jul. 28, 2021

(65) Prior Publication Data

US 2022/0235196 A1 Jul. 28, 2022

Related U.S. Application Data

(60) Provisional application No. 63/141,546, filed on Jan. 26, 2021.

(51) Int. Cl.
| | |
|---|---|
| *C08K 5/098* | (2006.01) |
| *B29C 48/00* | (2019.01) |
| *B29C 48/08* | (2019.01) |
| *B29C 48/91* | (2019.01) |
| *B29C 45/00* | (2006.01) |
| *C08F 110/02* | (2006.01) |
| *C08J 5/18* | (2006.01) |
| *C08L 23/06* | (2006.01) |
| *B29C 48/88* | (2019.01) |
| *B29L 7/00* | (2006.01) |

(52) U.S. Cl.
CPC .......... *C08K 5/098* (2013.01); *B29C 45/0001* (2013.01); *B29C 48/022* (2019.02); *B29C 48/08* (2019.02); *B29C 48/9135* (2019.02); *C08F 110/02* (2013.01); *C08J 5/18* (2013.01); *C08L 23/06* (2013.01); *B29K 2023/06* (2013.01); *B29L 2007/008* (2013.01); *C08J 2323/06* (2013.01); *C08J 2423/06* (2013.01); *C08L 2203/18* (2013.01); *C08L 2203/30* (2013.01); *C08L 2205/03* (2013.01); *C08L 2205/24* (2013.01); *C08L 2207/062* (2013.01)

(58) Field of Classification Search
USPC ................................................ 524/285, 396
See application file for complete search history.

(56) References Cited

U.S. PATENT DOCUMENTS

| | | |
|---|---|---|
| 6,465,551 B1 | 10/2002 | Zhao |
| 6,559,211 B2 | 5/2003 | Zhao |
| 7,094,820 B2 | 8/2006 | Zhao |
| 8,026,305 B2 | 9/2011 | McLeod |
| 8,436,085 B2 | 5/2013 | Borke |
| 8,809,433 B2 | 8/2014 | Borke |
| 9,587,093 B2 | 3/2017 | Aubee |
| 9,644,087 B2 | 5/2017 | Aubee |
| 9,850,369 B2 | 12/2017 | Aubee |
| 10,066,093 B2 | 9/2018 | Aubee |
| 2005/0038151 A1 | 2/2005 | Kochanowicz |
| 2005/0101710 A1 | 5/2005 | Lake, Jr. |
| 2005/0101713 A1 | 5/2005 | Lake, Jr. |
| 2020/0095397 A1 | 3/2020 | Xu |
| 2020/0231793 A1* | 7/2020 | Alvarez .................. C08L 23/12 |
| 2022/0033599 A1 | 2/2022 | Dotson |

FOREIGN PATENT DOCUMENTS

| | | |
|---|---|---|
| CA | 3032082 A1 | 7/2020 |
| JP | 2002348326 A | 12/2002 |

OTHER PUBLICATIONS

International Search Report and Written Opinion for App. No. PCT/US2021/043369, dated Nov. 16, 2021, 14 pages.
Darin L Dotson: "A novel nucleating agent for polyethylene", Internet Citation, Feb. 27, 2013 (Feb. 27, 2013), pp. 1-15, XP002726372, Retrieved from the Internet: URL:https://web.archive.org/web/20130227224237/http://www.tappi.org/content/events/07place/papers/dotson.pdf [retrieved on Jun. 30, 2014].

* cited by examiner

*Primary Examiner* — Fred M Teskin
(74) *Attorney, Agent, or Firm* — Robert M. Lanning

(57) ABSTRACT

A thermoplastic polymer composition comprises a polyethylene polymer composition and a salt of bicyclo[2.2.1]heptane-2,3-dicarboxylic acid. The polyethylene polymer composition can have a Melt Relaxation Product of 50,000 or less. A method for producing an injection molded article comprises the steps of (a) providing a thermoplastic polymer composition as described above, (b) melting the thermoplastic polymer composition, (c) injecting the molten thermoplastic polymer composition into a mold cavity, (d) cooling the molten thermoplastic polymer composition, and (e) ejecting the injection molded article from the mold cavity. A method for producing a film comprises the steps of (a) providing a thermoplastic polymer composition as described above, (b) melting the thermoplastic polymer composition, (c) extruding the molten thermoplastic polymer composition through a slot-shaped die orifice to form a film, (d) cooling the film, and (e) collecting the film.

21 Claims, No Drawings

THERMOPLASTIC POLYMER COMPOSITION AND METHOD FOR MAKING ARTICLES AND FILMS FROM THE SAME

CROSS-REFERENCE TO RELATED PATENT APPLICATIONS

This application claims, pursuant to 35 U.S.C. § 119(e), priority to and the benefit of the filing date of U.S. patent application Ser. No. 63/141,546, which was filed on Jan. 26, 2021, the contents of which are hereby incorporated by reference.

TECHNICAL FIELD OF THE INVENTION

The invention relates to thermoplastic polymer compositions and methods for making articles (e.g., injection molded articles) and films (e.g., cast films) from the same.

BACKGROUND

Several nucleating agents for thermoplastic polymers are known in the art. These nucleating agents generally function by forming nuclei or providing sites for the formation and/or growth of crystals in the thermoplastic polymer as it solidifies from a molten state. The nuclei or sites provided by the nucleating agent allow the crystals to form within the cooling polymer at a higher temperature and/or at a more rapid rate than the crystals will form in the virgin, non-nucleated thermoplastic polymer. These effects can then permit processing of a nucleated thermoplastic polymer composition at cycle times that are shorter than the virgin, non-nucleated thermoplastic polymer. Nucleating agents can also produce an orientation of crystalline lamellae in the polymer that would not result in a polymer that undergoes self-nucleated crystallization. Depending on the orientation of crystalline lamellae produced by the nucleating agent, the physical properties of articles made from the polymer can be improved relative to a polymer that undergoes self-nucleated crystallization.

Further, the effectiveness of a nucleating agent may depend on certain physical properties of the polymer that is being nucleated. In other words, a given nucleating agent may more effectively nucleate a polyethylene polymer having one set of physical properties than another polyethylene polymer having a different set of physical properties. The effectiveness of the nucleating agent often depends on several physical properties of the polymer. The interrelationship between the various physical properties and their effect on the nucleating agent has made it difficult to readily identify a pairing of nucleating agent and polymer that will yield a polymer composition having the desired characteristics.

Thus, a need remains for combinations of polymer and nucleating agent that exhibit favorable nucleation and yield polymer compositions having desirable physical properties, such as lower water vapor and oxygen transmission rates. A need also remains for processes utilizing such beneficial combinations of polymer and nucleating agent, such as injection molding and cast film processes. The polymer compositions and methods described in the application seek to fulfill these needs.

BRIEF SUMMARY OF THE INVENTION

In a first embodiment, the invention provides a thermoplastic polymer composition comprising:

(a) a polyethylene polymer composition having a Melt Relaxation Product of 50,000 or less; and
(b) a salt of bicyclo[2.2.1]heptane-2,3-dicarboxylic acid.

In a second embodiment, the invention provides a method for producing an injection molded article from a thermoplastic polymer composition. The method comprises the steps of:

(a) providing a thermoplastic polymer composition comprising (i) a polyethylene polymer composition having a Melt Relaxation Product of 50,000 or less; and (ii) a salt of bicyclo[2.2.1]heptane-2,3-dicarboxylic acid;
(b) heating the thermoplastic polymer composition to a temperature sufficient to melt the thermoplastic polymer composition so that it may be injected into a mold, the mold having a mold cavity defining the dimensions of an article;
(c) injecting the molten thermoplastic polymer composition into the mold cavity;
(d) allowing the molten thermoplastic polymer composition in the mold cavity to cool and solidify thereby forming an injection molded article; and
(e) opening the mold and ejecting the article from the mold cavity.

In a third embodiment, the invention provides a method for producing a film from a thermoplastic polymer composition. The method comprises the steps of:

(a) providing a thermoplastic polymer composition comprising (i) a polyethylene polymer composition having a Melt Relaxation Produce of 50,000 or less; and (ii) a salt of bicyclo[2.2.1]heptane-2,3-dicarboxylic acid;
(b) heating the thermoplastic polymer composition to a temperature sufficient to melt the thermoplastic polymer composition so that it may be extruded through a die;
(c) extruding the molten thermoplastic polymer composition through a die having a slot-shaped die orifice to form a film exiting the die orifice;
(d) passing the film exiting the die orifice over a cooled surface to solidify the thermoplastic polymer composition; and
(e) collecting the film.

DETAILED DESCRIPTION OF THE INVENTION

In a first embodiment, the invention provides a thermoplastic polymer composition comprising a polyethylene polymer composition and a salt of bicyclo[2.2.1]heptane-2,3-dicarboxylic acid.

The polyethylene polymer composition utilized in the composition can comprise any suitable polyethylene polymer or mixture of polyethylene polymers. However, it is believed that the bicyclo[2.2.1]heptane-2,3-dicarboxylic acid salt is more effective at nucleating polyethylene polymer compositions which exhibit greater degrees of melt relaxation. During certain melt processing of a polymer (e.g., injection molding or cast film manufacturing), the polymer melt is subjected to extensional thinning or strain as it is extruded through a die. The strain applied to the polymer melt results in a flow direction orientation of extended polymer chains in the polymer melt. As the processed polymer melt cools, these directionally oriented, extended polymer chains can return to a less ordered state before crystallization of the polymer melt. This process is referred to herein as "melt relaxation." Alternatively, the directionally oriented, extended polymer chains can remain oriented in the melt and crystallize to form fibrils. These fibrils provide sites which can initiate self-nucleation of the polymer. If enough of such fibrils form in the polymer as it solidifies from the melt, the resulting strain-induced self-nucleation can become the dominant mode of nucleation in the polymer. While self-nucleation of the polymer may sound beneficial, the polymer structure produced by such self-nucleation is generally less favorable for certain desired physical properties. For example, self-nucleated polyethylene generally exhibits higher water vapor and oxygen transmission rates than polyethylene that has been heterogeneously nucleated with a bicyclo[2.2.1]heptane-2,3-dicarboxylic acid salt. Thus, in order to maximize the degree of nucleation induced by the bicyclo[2.2.1]heptane-2,3-dicarboxylic acid salt, the thermoplastic polymer composition preferably contains a polyethylene polymer composition that exhibits sufficient melt relaxation to ensure that strain-induced, self-nucleation will not dominate.

The degree of melt relaxation exhibited by a polymer cannot easily be directly quantified. Further, it is believed that melt relaxation can be influenced by a number of factors, such as molecular weight, breadth of the molecular weight distribution, the relative amount of the high molecular weight fraction in the molecular weight distribution, and branching or non-linear chains in the polymer. The number of factors involved and the complex relationship between those factors make it difficult to identify ranges of values for each that will be sufficient to define a polyethylene polymer that exhibits sufficient melt relaxation. In other words, one might try to define a molecular weight distribution for polymers that exhibit sufficient melt relaxation, but the appropriate range will change with the "shape" of the distribution (i.e., the relative amount of the high molecular weight fraction). Thus, while these factors can be considered when attempting to identify a polyethylene polymer that exhibits sufficient melt relaxation, a more direct and accurate gauge of melt relaxation is needed.

Applicants have found that the complex viscosity ($\eta^*$) of a polyethylene polymer melt can, at least in part, lead to a more accurate gauge of melt relaxation. The complex viscosity ($\eta^*$) relies on complex numbers and is composed of a real part referred to as the dynamic viscosity ($\eta'$) and an imaginary part referred to as the out-of-phase viscosity ($\eta''$). These values are typically obtained by parallel plate rheology experiments, which are well known in the industry and described more fully below. The complex viscosity results obtained by such measurements can be plotted with out-of-phase viscosity as the y-axis and dynamic viscosity as the x-axis. Such a plot is commonly referred to as a Cole-Cole plot. For the substantially linear polyethylene polymer compositions that are of interest here, the Cole-Cole plot bends into a circular arc, and this circular arc approximates the circumference of a circle whose cartesian coordinates follow the equation:

$$r^2 = (x-h)^2 + (y-k)^2.$$

In the equation above, x corresponds to the dynamic viscosity ($\eta'$) value, and y corresponds to the out-of-phase viscosity ($\eta''$) value at each strain rate. The constants h and k represent the offset of the center of the circle from the cartesian origin of the Cole-Cole plot in the x and y direction, respectively. Due to the nature of the complex viscosity, the value of h is a positive number, and the value of k is a negative number. The radius of this circle (i.e., the circle approximated by the Cole-Cole plot) has been found to be related to the degree of melt relaxation in a polyethylene polymer composition, with smaller radii generally being indicative of greater melt relaxation in the polymer and larger radii generally being indicative of less melt relaxation in the polymer.

Unfortunately, the radius of the circle to which the Cole-Cole plot generally fits cannot reliably be calculated from a single point on the Cole-Cole plot. The natural, small variations in the complex viscosity measurements will yield slightly different radius values for each x,y pair. Therefore, to determine the radius of this circle, it is necessary to fit the measured dynamic viscosity ($\eta'$) and out-of-phase viscosity ($\eta''$) values to the foregoing equation using a least squares approach. In this fitting process, the radius for each x,y pair is calculated by rearranging the circle equation, and the square of the error (SE) for each x,y pair is calculated by squaring the difference between the average radius (i.e., the radius obtained by averaging the radius calculated for each x,y pair) and the radius calculated for that particular x.y pair. The sum of the squared errors (SSE) is then calculated by taking the sum of the SE for all x,y pairs in the Cole-Cole plot. The fitting of the data is executed by varying the values for h and k until the sum of the squared errors (SSE) is minimized. Since the calculated radius at any x,y pair depends on h and k, the individual radii are updated as a result of fitting h and k, and the average radius is also simultaneously updated. The resulting average radius value (i.e., the arithmetic mean of the radii for each x,y pair after the least squares fit has been performed) will be hereafter referred to as the average radius of the Cole-Cole plot ($r_{avg}$).

As stated above, the average radius of the Cole-Cole plot has been found to be related to the degree of melt relaxation in a polyethylene polymer composition. However, the average radius of the Cole-Cole plot is also affected by the Melt Flow Index (MFI) of the polyethylene polymer composition. In particular, for polymers with similar molecular weight distribution and branching levels, the average radius of the Cole-Cole plot tends to decrease significantly as the MFI of the polyethylene polymer composition increases and molecular weight decreases. In this case, viscosity in general decreases, and it is well known that less viscous polymer melts, on average, relax more rapidly. But factors mentioned earlier such as broader molecular weight distribution, high molecular weight tail, or branching may cause an unexpectedly high radius for a given MFI, resulting in unexpectedly high viscosity and unexpectedly long average melt relaxation times. In addition, the MFI range typically seen in polymers used for injection molding and cast film manufacturing can be quite wide. Thus, a need exists to predict whether resins over a wider MFI range will relax sufficiently in the melt to allow efficient nucleation via heterogeneous nucleation with the bicyclo[2.2.1]heptane-2,3-dicarboxylic acid salt, or whether insufficient melt relaxation causes self-nucleation to become important or even dominate. Therefore, in order to arrive at a measure that is a useful tool in quantifying melt relaxation across a range of polymers, it is necessary to correct or account for the effect of MFI on the average radius of the Cole-Cole plot. Given the generally inverse relationship between the two, the inventors have found that this effect can best be corrected or accounted for by calculating the product of the Melt Flow Index (MFI) of the polymer and the average radius of the Cole-Cole plot ($r_{avg}$) of the polymer. The resulting product is hereafter referred to as the "Melt Relaxation Product" (MRP). Through extensive experimentation, the inventors have found that the Melt Relaxation Product (MRP) is a good measure of the degree of melt relaxation in a polymer, with higher MRP indicating lesser degrees of melt relaxation and lower MRP indicating higher degrees of melt relaxation. In simple terms, a higher MFI polymer would normally have a lower $r_{avg}$, offsetting the higher MFI in the MRP equation and leveling the magnitude of MRP. But if $r_{avg}$ is unexpectedly high for such a high MFI resin, the offset does not occur and MRP increases considerably. This condition is typified by less effective melt relaxation.

As noted above, the Melt Relaxation Product (MRP) is defined as the product of (i) the Melt Flow Index (MFI) of the polyethylene polymer composition and (ii) the average radius of the Cole-Cole plot ($r_{avg}$) of the dynamic viscosity ($\eta'$) and out-of-phase viscosity ($\eta''$) of the polyethylene polymer composition:

$$MRP=MFI \times r_{avg}.$$

The Melt Flow Index of the polyethylene polymer composition, which can be reported in units of decigrams per minute (dg/min) or grams per 10 minutes (g/10 min), is measured in accordance with ASTM Standard D1238 at 190° C. using a 2.16 kg load. The polyethylene polymer composition utilized in the embodiments of the invention preferably has an MRP of 50,000 or less. More preferably, the polyethylene polymer composition has an MRP of about 45,000 or less, about 40,000 or less, or about 35,000 or less. The inventors have not identified a lower limit on the MRP for polyethylene polymer compositions suitable for use in the disclosed polymer compositions. However, given the manner in which it is calculated, the MRP will be a positive number greater than 1 and can be quite low for many very high MFI polyethylene polymers. Preferably, the MRP is about 100 or more, about 1,000 or more, about 5,000 or more, or about 10,000 or more. Thus, in a series of preferred embodiments, the polyethylene polymer composition has an MRP of about 1 to 50,000 (e.g., about 1 to about 45,000, about 1 to about 40,000, or about 1 to about 35,000), about 100 to 50,000 (e.g., about 100 to about 45,000, about 100 to about 40,000, or about 100 to about 35,000), about 1,000 to 50,000 (e.g., about 1,000 to about 45,000, about 1,000 to about 40,000, or about 1,000 to about 35,000), or about 10,000 to 50,000 (e.g., about 10,000 to about 45,000, about 10,000 to about 40,000, or about 10,000 to about 35,000).

The Melt Relaxation Product can be determined by any suitable technique. Preferably, the out-of-phase viscosity ($\eta''$) and the dynamic viscosity ($\eta'$) are measured by parallel plate rheometry at a temperature of 140° C. using a rotational rheometer equipped with 25 mm parallel plates set at a 1.1 mm gap. The polymer sample used for measurement is provided in the form of a compression molded disc. During the measurement, the angular distance or strain preferably is kept low to remain in the non-hysteresis region, with a nominal strain of approximately one percent being preferred. To obtain adequate data, the oscillation frequency preferably is swept over several decades covering a range of approximately 0.15 rad/s to approximately 150 rad/s. For example, measurements can be taken at angular frequencies of approximately 0.147 rad/s, approximately 0.216 rad/s, approximately 0.317 rad/s, approximately 0.467 rad/s, approximately 0.683 rad/s, approximately 1.003 rad/s, approximately 1.472 rad/s, approximately 2.160 rad/s, approximately 3.171 rad/s, approximately 4.655 rad/s, approximately 6.832 rad/s, approximately 10.028 rad/s, approximately 14.719 rad/s, approximately 21.604 rad/s, approximately 31.711 rad/s, approximately 46.545 rad/s, approximately 68.319 rad/s, approximately 100.279 rad/s, and approximately 147.198 rad/s. Utilizing these exact frequencies is not necessary, but utilizing a similar number of frequencies near these values and spanning a similar range has been observed to produce reliable results.

Once the out-of-phase viscosity ($\eta''$) and the dynamic viscosity ($\eta'$) for the polymer have been measured, the average radius of the Cole-Cole plot can be determined using the least squares approach as described above. To facilitate calculation of the average radius using the least squares approach, one of various software programs (e.g., Microsoft® Excel™ with the solver add-in installed) can be used to fit the actual data. For example, when using Microsoft® Excel, a spreadsheet is created having columns with equations for individual radius (r), individual out-of-phase viscosity (y), dynamic viscosity (x), and square of the error (SE) at each dynamic viscosity and out-of-phase viscosity (x,y) pair. Then, the sum of the squared errors (SSE) is located in the workbook cell set as the "Set Objective;" field to Minimize, while constants h and k are located in the workbook cells in the "By Changing Variable Cells:" field. To avoid possible local minima, it is preferred to select "Use Multi-Start" under GRG Nonlinear, which requires boundaries on h and k. For h, the boundary preferably is set to greater than zero but less than some number larger than the largest expected h value. Likewise for k, the boundary preferably is set to less than zero but greater than some large negative number well more negative than the expected k values.

Since these parameters are determined from the polymer melt, the presence of the nucleating agent will not have any appreciable effects on the out-of-phase viscosity ($\eta''$), the dynamic viscosity ($\eta'$), or Melt Flow Index measured from the polyethylene polymer composition. Therefore, these parameters (and the Melt Relaxation Product) can be measured from the polyethylene polymer composition before it is combined with the bicyclo[2.2.1]heptane-2,3-dicarboxylic acid salt, or the parameters can be measured from a thermoplastic polymer composition comprising the polyethylene polymer composition and the bicyclo[2.2.1]heptane-2,3-dicarboxylic acid salt.

As noted above, the polyethylene polymer composition can comprise any suitable polyethylene polymer or mixture of polyethylene polymers exhibiting the desired Melt Relaxation Product. Thus, the polyethylene polymer composition can comprise a single polyethylene polymer exhibiting the desired Melt Relaxation Product. Alternatively, the polyethylene polymer composition can comprise a mixture of two or more polyethylene polymers in which the mixture exhibits the desired Melt Relaxation Product. In such a mixture, each polyethylene polymer can exhibit a Melt Relaxation Product falling within the desired range, but this is not necessary. For example, a polyethylene polymer exhibiting a relatively high Melt Relaxation Product (e.g., greater than 50,000) can be mixed with an appropriate amount of another polyethylene polymer having a lower Melt Relaxation Product (e.g., less than 50,000) to yield a polyethylene polymer composition exhibiting the desired Melt Relaxation Product.

Polyethylene polymers suitable for use in the polyethylene polymer composition include polyethylene homopolymers and polyethylene copolymers. Suitable polyethylene copolymers include copolymers of ethylene with one or more α-olefins. Suitable α-olefins include, but are not limited to, 1-butene, 1-hexene, 1-octene, 1-decene, and 4-methyl-1-pentene. The comonomer can be present in the copolymer in any suitable amount, such as an amount of about 8% by weight or less (e.g., less than about 5 mol %) or more preferably about 5% by weight or less (e.g., about 3 mol. % or less). As will be understood by those of ordinary skill in the art, the amount of comonomer suitable for the polyethylene copolymer is largely driven by the end use for the copolymer and the required or desired polymer properties dictated by that end use.

The polyethylene polymers suitable for use in the thermoplastic polymer composition can be produced by any suitable process. For example, the polymers can be produced by a free radical process using very high pressures as described, for example, in U.S. Pat. No. 2,816,883 (Larchar et al.), but the polymers typically are produced in a "low pressure" catalytic process. In this context, the term "low pressure" is used to denote processes carried out at pressures less than 6.9 MPa (e.g., 1,000 psig), such as 1.4-6.9 MPa (200-1,000 psig). Examples of suitable low pressure catalytic processes include, but are not limited to, solution polymerization processes (i.e., processes in which the polymerization is performed using a solvent for the polymer), slurry polymerization processes (i.e., processes in which the polymerization is performed using a hydrocarbon liquid in which the polymer does not dissolve or swell), gas-phase polymerization processes (e.g., processes in which the polymerization is performed without the use of a liquid medium or diluent), or a staged reactor polymerization process. The suitable gas-phase polymerization processes also include the so-called "condensed mode" or "super-condensed mode" processes in which a liquid hydrocarbon is introduced into the fluidized-bed to increase the absorption of the heat produced during the polymerization process. In these condensed mode and super-condensed mode processes, the liquid hydrocarbon typically is condensed in the recycle stream and reused in the reactor. The staged reactor processes can utilize a combination of slurry process reactors (tanks or loops) that are connected in series, parallel, or a combination of series or parallel so that the catalyst (e.g., chromium catalyst) is exposed to more than one set of reaction conditions. Staged reactor processes can also be carried out by combining two loops in series, combining one or more tanks and loops in series, using multiple gas-phase reactors in series, or a loop-gas phase arrangement. Because of their ability to expose the catalyst to different sets of reactor conditions, staged reactor processes are often used to produce multimodal polymers, such as those discussed below. Suitable processes also include those in which a pre-polymerization step is performed. In this pre-polymerization step, the catalyst typically is exposed to the cocatalyst and ethylene under mild conditions in a smaller, separate reactor, and the polymerization reaction is allowed to proceed until the catalyst comprises a relatively small amount (e.g., about 5% to about 30% of the total weight) of the resulting composition. This pre-polymerized catalyst is then introduced to the large-scale reactor in which the polymerization is to be performed.

The polyethylene polymers suitable for use in the thermoplastic polymer composition can be produced using any suitable catalyst or combination of catalysts. Suitable catalysts include transition metal catalysts, such as supported reduced molybdenum oxide, cobalt molybdate on alumina, chromium oxide, and transition metal halides. Chromium oxide catalysts typically are produced by impregnating a chromium compound onto a porous, high surface area oxide carrier, such as silica, and then calcining it in dry air at 500-900° C. This converts the chromium into a hexavalent surface chromate ester or dichromate ester. The chromium oxide catalysts can be used in conjunction with metal alkyl cocatalysts, such as alkyl boron, alkyl aluminum, alkyl zinc, and alkyl lithium. Supports for the chromium oxide include silica, silica-titania, silica-alumina, alumina, and aluminophosphates. Further examples of chromium oxide catalysts include those catalysts produced by depositing a lower valent organochromium compound, such as bis(arene) $Cr^0$, allyl $Cr^{2+}$ and $Cr^{3+}$, beta stabilized alkyls of $Cr^{2+}$ and $Cr^{4+}$, and bis(cyclopentadienyl) $Cr^{2+}$, onto a chromium oxide catalyst, such as those described above. Suitable transition metal catalysts also include supported chromium catalysts such as those based on chromocene or a silylchromate (e.g., bi(trisphenylsilyl)chromate). These chromium catalysts can be supported on any suitable high surface area support such as those described above for the chromium oxide catalysts, with silica typically being used. The supported chromium catalysts can also be used in conjunction with cocatalysts, such as the metal alkyl cocatalysts listed above for the chromium oxide catalysts. Suitable transition metal halide catalysts include titanium (III) halides (e.g., titanium (III) chloride), titanium (IV) halides (e.g., titanium (IV) chloride), vanadium halides, zirconium halides, and combinations thereof. These transition metal halides are often supported on a high surface area solid, such as magnesium chloride. The transition metal halide catalysts are typically used in conjunction with an aluminum alkyl cocatalyst, such as trimethylaluminum (i.e., $Al(CH_3)_3$) or triethylaluminum (i.e., $Al(C_2H_5)_3$). These transition metal halides may also be used in staged reactor processes. Suitable catalysts also include metallocene catalysts, such as cyclopentadienyl titanium halides (e.g., cyclopentadienyl titanium chlorides), cyclopentadienyl zirconium halides (e.g., cyclopentadienyl zirconium chlorides), cyclopentadienyl hafnium halides (e.g., cyclopentadienyl hafnium chlorides), and combinations thereof. Metallocene catalysts based on transition metals complexed with indenyl or fluorenyl ligands are also known and can be used to produce high density polyethylene polymers suitable for use in the invention. The catalysts typically contain multiple ligands, and the ligands can be substituted with various groups (e.g., n-butyl group) or linked with bridging groups, such as —$CH_2CH_2$— or >$SiPh_2$. The metallocene catalysts typically are used in conjunction with a cocatalyst, such as methyl alum inoxane (i.e., $(Al(CH_3)_xO_y)_n$. Other cocatalysts include those described in U.S. Pat. No. 5,919,983 (Rosen et al.), U.S. Pat. No. 6,107,230 (McDaniel et al.), U.S. Pat. No. 6,632,894 (McDaniel et al.), and U.S. Pat. No. 6,300,271 (McDaniel et al). Other "single site" catalysts suitable for use in producing polyethylene polymers include diimine complexes, such as those described in U.S. Pat. No. 5,891,963 (Brookhart et al.).

The polyethylene polymer composition (and the polyethylene polymer(s) present in such composition) can have any suitable density. Suitable densities range from about 880 $kg/m^3$ to about 970 $kg/m^3$. Preferably, the polyethylene polymer composition has a density of about 940 $kg/m^3$ or more (e.g., about 940 $kg/m^3$ to about 970 $kg/m^3$). More preferably, the polyethylene polymer composition has a density from about 945 $kg/m^3$ to about 967 $kg/m^3$. In another preferred embodiment, the polyethylene polymer composition has a density from about 955 $kg/m^3$ to about 965 $kg/m^3$.

The polyethylene polymer composition (and the polyethylene polymer(s) present in such composition) can have any suitable Melt Flow Index (MFI). Preferably, the polyethylene polymer composition has an MFI of about 1 dg/min or more (e.g., about 2 dg/min or more). In another preferred embodiment, the polyethylene polymer composition has an MFI of about 4 dg/min or more. Preferably, the polyethylene polymer composition has an MFI of about 80 dg/min or less. In another preferred embodiment, the polyethylene polymer composition has an MFI of about 60 dg/min or less. In yet another preferred embodiment, the polyethylene polymer composition has an MFI of about 40 dg/min or less. Thus, in a series of preferred embodiments, the polyethylene polymer composition has an MFI of about 1 dg/min to about 80 dg/min (e.g., about 1 dg/min to about 60 dg/min or about 1 dg/min to about 40 dg/min), about 2 dg/min to about 80 dg/min (e.g., about 2 dg/min to about 60 dg/min or about 2 dg/min to about 40 dg/min), or about 4 dg/min to about 80 dg/min (e.g., about 4 dg/min to about 60 dg/min or about 4 dg/min to about 40 dg/min). The Melt Flow Index of the polyethylene polymer composition preferably is measured in accordance with ASTM Standard D1238 at 190° C. using a 2.16 kg load.

The thermoplastic polymer composition comprises a salt of bicyclo[2.2.1]heptane-2,3-dicarboxylic acid. The two carboxylate moieties of the bicyclo[2.2.1]heptane-2,3-dicarboxylate anion preferably are located in the cis position relative to one another. Further, the two carboxylate moieties of the bicyclo[2.2.1]heptane-2,3-dicarboxylate anion preferably are in the endo position relative to the longest bridge of the anion. Thus, in a preferred embodiment, the thermoplastic polymer composition comprises a salt of cis-endo-bicyclo[2.2.1]heptane-2,3-dicarboxylic acid (i.e., (1R,2R,3S,4S)-bicyclo[2.2.1]heptane-2,3-dicarboxylic acid). The salt of bicyclo[2.2.1]heptane-2,3-dicarboxylic acid can comprise any suitable counterion for the bicyclo[2.2.1]heptane-2,3-dicarboxylate anion. Preferably, the counterion is selected from the group consisting of alkali metal cations and alkaline earth metal cations. In another preferred embodiment, the counterion is selected from the group consisting of alkaline earth metal cations. Most preferably, the counterion is a calcium cation (i.e., a $Ca^{2+}$ cation). Thus, in a particularly preferred embodiment, the salt is calcium bicyclo[2.2.1]heptane-2,3-dicarboxylate, particularly calcium cis-endo-bicyclo[2.2.1]heptane-2,3-dicarboxylate (i.e., calcium (1R,2R,3S,4S)-bicyclo[2.2.1]heptane-2,3-dicarboxylate).

The salt of a bicyclo[2.2.1]heptane-2,3-dicarboxylic acid can be either a hydrate (i.e., a crystalline solid with water of crystallization) or a dehydrate (i.e., a crystalline solid without water of crystallization) Those skilled in the art will appreciate that the salt of a bicyclo[2.2.1]heptane-2,3-dicarboxylic can also be a physical mixture of a hydrate and a dehydrate. In a preferred embodiment, the salt of a bicyclo[2.2.1]heptane-2,3-dicarboxylic acid is a dehydrate. In another preferred embodiment, the salt of a bicyclo[2.2.1]heptane-2,3-dicarboxylic acid is a hydrate, more preferably a monohydrate. Those skilled in the art will recognize that when starting with a monohydrate form, melt processing of the polymer composition may remove at least some of the water of crystallization in the bicyclo[2.2.1]heptane-2,3-dicarboxylic acid salt, which would yield a mixture of the monohydrate and dehydrate. Thus, in one preferred embodiment described above, the salt of a bicyclo[2.2.1]heptane-2,3-dicarboxylic acid is a dehydrate prior to melt processing of the thermoplastic polymer composition. Accordingly, the corresponding thermoplastic polymer composition is prepared by adding the desired amount of the dehydrate of a salt of a bicyclo[2.2.1]heptane-2,3-dicarboxylic acid to the polyethylene polymer composition described above. In the other preferred embodiment, the salt of a bicyclo[2.2.1]heptane-2,3-dicarboxylic acid is a hydrate (preferably, a monohydrate) prior to melt processing of the thermoplastic polymer composition. Accordingly, the corresponding thermoplastic polymer composition is prepared by adding the desired amount of the hydrate of a salt of a bicyclo[2.2.1]heptane-2,3-dicarboxylic acid to the polyethylene polymer composition described above. The addition of the bicyclo[2.2.1]heptane-2,3-dicarboxylic acid salt can be made by dry blending of the salt and the polyethylene polymer composition prior to melt compounding or the salt can be added to the polyethylene polymer composition while it is being melt processed, such as through a side feeder attached to an extruder.

The thermoplastic polymer composition can contain any suitable amount of the salt of bicyclo[2.2.1]heptane-2,3-dicarboxylic acid. In a preferred embodiment, the thermoplastic polymer composition comprises about 50 ppm or more of the salt of bicyclo[2.2.1]heptane-2,3-dicarboxylic acid. In another preferred embodiment, the thermoplastic polymer composition comprises about 100 ppm or more of the salt of bicyclo[2.2.1]heptane-2,3-dicarboxylic acid. In yet another preferred embodiment, the thermoplastic polymer composition comprises about 200 ppm or more of the salt of bicyclo[2.2.1]heptane-2,3-dicarboxylic acid. In a preferred embodiment, the thermoplastic polymer composition comprises about 5,000 ppm or less of the salt of bicyclo[2.2.1]heptane-2,3-dicarboxylic acid. In another preferred embodiment, the thermoplastic polymer composition comprises about 3,000 ppm or less of the salt of bicyclo[2.2.1]heptane-2,3-dicarboxylic acid. In yet another preferred embodiment, the thermoplastic polymer composition comprises about 2,500 ppm or less of the salt of bicyclo[2.2.1]heptane-2,3-dicarboxylic acid. Thus, in a series of preferred embodiments, the thermoplastic polymer composition comprises about 50 ppm to about 5,000 ppm (e.g., about 50 ppm to about 3,000 ppm, about 50 ppm to about 2,500 ppm, or about 50 to about 2,000 ppm), about 100 ppm to about 5,000 ppm (e.g., about 100 ppm to about 3,000 ppm, about 100 ppm to about 2,500 ppm, or about 100 to about 2,000 ppm), or about 200 to about 5,000 ppm (e.g., about 200 ppm to about 3,000 ppm, about 200 ppm to about 2,500 ppm, or about 200 to about 2,000 ppm) of the salt of bicyclo[2.2.1]heptane-2,3-dicarboxylic acid.

In a preferred embodiment, the thermoplastic polymer composition comprises an acid scavenger in addition to the polyethylene polymer composition and the salt of bicyclo[2.2.1]heptane-2,3-dicarboxylic acid. Suitable acid scavengers include, but are not limited to, salts of fatty acids, hydrotalcite compounds, and mixtures thereof.

Thus, in one preferred embodiment, the thermoplastic polymer composition comprises a salt of a fatty acid in addition to the polyethylene polymer composition and the salt of bicyclo[2.2.1]heptane-2,3-dicarboxylic acid. In a preferred embodiment, the salt of a fatty acid is a salt of a $C_{12}$-$C_{22}$ fatty acid, more preferably a salt of a $C_{14}$-$C_{20}$ fatty acid or a $C_{16}$-$C_{18}$ fatty acid. In another preferred embodiment, the fatty acid is a saturated fatty acid (e.g., a saturated $C_{12}$-$C_{22}$ fatty acid, a saturated $C_{14}$-$C_{20}$ fatty acid, or a saturated $C_{16}$-$C_{18}$ fatty acid). In a particularly preferred embodiment, the salt of a fatty acid is a salt of stearic acid. The salt of a fatty acid can comprise any suitable counterion for the fatty acid anion. Preferably, the counterion is selected from the group consisting of alkali metal cations (e.g., a sodium cation or a potassium cation), alkaline earth metal cations (e.g., a magnesium cation or a calcium cation), and Group 12 cations (e.g., a zinc cation). In a preferred embodiment, the counterion of the salt of a fatty acid is a zinc cation. Thus, in a particularly preferred embodiment, the salt of a fatty acid is zinc stearate (i.e., the polymer composition further comprises zinc stearate).

When present in the thermoplastic polymer composition, the salt of a fatty acid can be present in any suitable amount. In a preferred embodiment, the thermoplastic polymer composition comprises about 50 ppm or more of the salt of a fatty acid. In another preferred embodiment, the thermoplastic polymer composition comprises about 100 ppm or more of the salt of a fatty acid. In yet another preferred embodiment, the thermoplastic polymer composition comprises about 200 ppm or more of the salt of a fatty acid. In a preferred embodiment, the thermoplastic polymer composition comprises about 5,000 ppm or less of the salt of a fatty acid. In another preferred embodiment, the thermoplastic polymer composition comprises about 3,000 ppm or less of the salt of a fatty acid. In yet another preferred embodiment, the thermoplastic polymer composition comprises about 2,500 ppm or less of the salt of a fatty acid. Thus, in a series of preferred embodiments, the thermoplastic polymer composition comprises about 50 ppm to about 5,000 ppm (e.g., about 50 ppm to about 3,000 ppm, about 50 ppm to about 2,500 ppm, or about 50 to about 2,000 ppm), about 100 ppm to about 5,000 ppm (e.g., about 100 ppm to about 3,000 ppm, about 100 ppm to about 2,500 ppm, or about 100 to about 2,000 ppm), or about 200 to about 5,000 ppm (e.g., about 200 ppm to about 3,000 ppm, about 200 ppm to about 2,500 ppm, or about 200 to about 2,000 ppm) of the salt of a fatty acid.

When present in the thermoplastic polymer composition, the salt of a fatty acid can be present in any suitable relative amount with respect to the amount of the salt of a bicyclo[2.2.1]heptane-2,3-dicarboxylic acid. In a preferred embodiment, the two are present in the thermoplastic polymer composition in a mass ratio of about 5:1 to about 1:5 based on the mass of the salt of a bicyclo[2.2.1]heptane-2,3-dicarboxylic acid to the mass of the salt of a fatty acid. In another preferred embodiment, the two are present in the thermoplastic polymer composition in a mass ratio of about 3:1 to about 1:3 based on the mass of the salt of a bicyclo[2.2.1]heptane-2,3-dicarboxylic acid to the mass of the salt of a fatty acid. In yet another preferred embodiment, the two are present in the thermoplastic polymer composition in a mass ratio of about 2:1 to about 1:2 based on the mass of the salt of a bicyclo[2.2.1]heptane-2,3-dicarboxylic acid to the mass of the salt of a fatty acid. More preferably, the two are present in the thermoplastic polymer composition in a mass ratio of about 2:1 to about 1:1 based on the mass of the salt of a bicyclo[2.2.1]heptane-2,3-dicarboxylic acid to the mass of the salt of a fatty acid. Most preferably, the two are present in the thermoplastic polymer composition in a mass ratio of about 2:1 based on the mass of the salt of a bicyclo[2.2.1]heptane-2,3-dicarboxylic acid to the mass of the salt of a fatty acid.

In another preferred embodiment, the thermoplastic polymer composition comprises a hydrotalcite compound in addition to the polyethylene polymer composition and the salt of bicyclo[2.2.1]heptane-2,3-dicarboxylic acid. Suitable hydrotalcite compounds can be either naturally occurring or synthetically produced, though synthetically produced materials are generally preferred. Suitable synthetic hydrotalcite compounds include, but are not limited to, the line of materials sold by Kyowa Chemical Industry Co., Ltd. under the "DHT" name, such as the DHT-4A® hydrotalcite-like material. When present in the thermoplastic polymer composition, the hydrotalcite compound can be present in any suitable amount, including any of the amounts and/or ratios described above for the salt of a fatty acid. Further, the thermoplastic polymer composition can, in certain embodiments, comprise both a salt of a fatty acid and a hydrotalcite compound.

The thermoplastic polymer composition described herein can be used to produce any suitable article or product. Suitable products include, but are not limited to, medical devices (e.g., pre-filled syringes for retort applications, intravenous supply containers, and blood collection apparatus), food packaging, liquid containers (e.g., containers for drinks, medications, personal care compositions, shampoos, and the like), apparel cases, microwavable articles, shelving, cabinet doors, mechanical parts, automobile parts, sheets, pipes, tubes, rotationally molded parts, blow molded parts, films, fibers, and the like. The thermoplastic polymer composition can be formed into the desired article by any suitable technique, such as injection molding, injection rotational molding, blow molding (e.g., injection blow molding or injection stretch blow molding), extrusion (e.g., sheet extrusion, film extrusion, cast film extrusion, or foam extrusion), extrusion blow molding, thermoforming, rotomolding, film blowing (blown film), film casting (cast film), and the like. The thermoplastic polymer composition disclosed herein is believed to be particularly well-suited for use in injection molding and cast film processes, with injection molding processes being particularly preferred.

The disclosed thermoplastic polymer composition is believed to be well-suited for use in injection molding and cast film processes because of its exceptionally improved (i.e., lower) water vapor and oxygen transmission rates as compared to the unnucleated polymer as well as nucleated polymers that do not exhibit the described physical properties (e.g., density, Melt Relaxation Product, Melt Flow Index, etc.). For example, a cast film made from the disclosed thermoplastic polymer composition has been observed to exhibit markedly lower water vapor and oxygen transmission rates than a similar cast film made from a nucleated polymer that does not exhibit the desired Melt Relaxation Product. Further, injection molded articles made from the disclosed thermoplastic polymer composition have been observed to exhibit markedly lower water vapor and oxygen transmission rates than a similar injection molded articles made from a nucleated polymer that does not exhibit the desired Melt Relaxation Product. As described noted above, this result is believed to be attributable to the selection of a polyethylene polymer composition that exhibits sufficient melt relaxation to maximize the nucleating effects of the bicyclo[2.2.1]heptane-2,3-dicarboxylic acid salt.

Thus, in a second embodiment, the invention provides a method for a method for producing an injection molded article from a thermoplastic polymer composition. The method comprises the steps of:

(a) providing a thermoplastic polymer composition comprising (i) a polyethylene polymer composition having a Melt Relaxation Product of 50,000 or less; and (ii) a salt of bicyclo[2.2.1]heptane-2,3-dicarboxylic acid;

(b) heating the thermoplastic polymer composition to a temperature sufficient to melt the thermoplastic polymer composition so that it may be injected into a mold, the mold having a mold cavity defining the dimensions of an article;

(c) injecting the molten thermoplastic polymer composition into the mold cavity;

(d) allowing the molten thermoplastic polymer composition in the mold cavity to cool and solidify thereby forming an injection molded article; and (e) opening the mold and ejecting the article from the mold cavity.

The thermoplastic polymer composition utilized in the method of this second embodiment can be any of the thermoplastic polymer compositions described above. The apparatus used in practicing the method of the invention can be any suitable injection molding apparatus.

In the method described above, the thermoplastic polymer composition can be heated to any suitable temperature that melts the thermoplastic polymer composition and allows it to be injected into the mold cavity. The temperature to which the thermoplastic polymer composition is heated does not have a significant effect on the nucleation performance of the bicyclo[2.2.1]heptane-2,3-dicarboxylate salt, but higher temperatures may promote greater and faster melt relaxation which could, in turn, improve nucleation performance to some degree. However, the temperature to which the thermoplastic polymer composition is heated should not be excessively high so as to cause excessive "flashing" (i.e., melt leakage from the seam of the mold). Preferably, the thermoplastic polymer composition is heated to a temperature of about 150° C. to about 220° C. The thermoplastic polymer composition can initially be heated to a temperature of about 150° C. to about 170° C. in the feed throat of the extruder followed by heating to a temperature of about 180° C. to about 220° C. in the final zones of the extruder. Once heated to the desired temperature, the molten thermoplastic polymer composition preferably is maintained at the desired temperature until it is injected into the mold cavity.

In a third embodiment, the invention also provides a method for producing a film from a thermoplastic polymer composition. The method comprises the steps of:

(a) providing a thermoplastic polymer composition comprising (i) a polyethylene polymer composition having a Melt Relaxation Produce of 50,000 or less; and (ii) a salt of bicyclo[2.2.1]heptane-2,3-dicarboxylic acid;

(b) heating the thermoplastic polymer composition to a temperature sufficient to melt the thermoplastic polymer composition so that it may be extruded through a die;

(c) extruding the molten thermoplastic polymer composition through a die having a slot-shaped die orifice to form a film exiting the die orifice;

(d) passing the film exiting the die orifice over a cooled surface to solidify the thermoplastic polymer composition; and (e) collecting the film.

The thermoplastic polymer composition utilized in the method of this second embodiment can be any of the thermoplastic polymer compositions described above. The apparatus used in practicing the method of the invention can be any suitable cast film apparatus. For example, the cast film machine can be equipped with a single extruder and die that produces a monolayer film. Alternatively, the cast film machine can be equipped with one or more extruders and an appropriate die feedblock adapted to produce and combine multiple separate layers in the melt into a single film. The films produced by such a cast film machine would be multilayer films. When a multilayer film is produced, the thermoplastic polymer composition of the invention can be used to produce any one or more layers of the multilayer film. In other words, the method described above encompasses methods of producing multilayer films in which all layers of the film are produced using the recited thermoplastic polymer composition as well as multilayer films in which the recited thermoplastic polymer composition is used to produce at least one layer of the multilayer film and one or more additional polymer compositions are used to produce the remaining layers of the multilayer film.

In the method described above, the thermoplastic polymer composition can be heated to any suitable temperature that melts the thermoplastic polymer composition and allows it to be extruded through the die. The temperature to which the thermoplastic polymer composition is heated does not have a significant effect on the nucleation performance of the bicyclo[2.2.1]heptane-2,3-dicarboxylate salt, but higher temperatures may promote greater and faster melt relaxation which could, in turn, improve nucleation performance to some degree. However, the temperature to which the thermoplastic polymer composition is heated should not be excessively high, which may lower the viscosity of the molten polymer composition to a point where the quality of the cast film suffers. Preferably, the thermoplastic polymer composition is heated to a temperature of about 150° C. to about 220° C. The thermoplastic polymer composition can initially be heated to a temperature of about 150° C. to about 170° C. in the feed throat of the extruder followed by heating to a temperature of about 180° C. to about 220° C. in the final zones of the extruder, transfer line section(s), and slot die. Once heated to the desired temperature, the molten thermoplastic polymer composition preferably is maintained at the desired temperature until it is extruded through the die orifice. Depending on polymer characteristics, those of ordinary skill in the art of cast film production will recognize the need for temperature adjustments to maintain an appropriate compromise between mass output, system back pressures, and film stability.

The molten polymer can be fed directly from the extruder to the die orifice. Alternatively, the molten polymer can be fed from the extruder into a melt pump which is connected to the die or die feedblock. Suitable melt pumps preferably are positive displacement devices that produce a consistent flow of molten polymer to the die or die feedblock regardless of the discharge pressure of the extruder. The use of a melt pump can provide steadier short-term mass output than an extruder alone, which in turn can minimize machine direction thickness variation in the cast film (i.e., "surging").

After exiting the die, the film is passed over a cooled surface to solidify the thermoplastic polymer composition. This cooled surface typically is one or more quenching rolls that are cooled, for example, by circulating chilled water or another cooling agent through the interior volume of the roll. In some applications, a vacuum box can be used to remove entrained air that would otherwise be trapped between the quenching roll surface and the film. Such entrained air acts as thermal insulation, so reducing or eliminating the amount of entrained air will increase the speed at which the film is cooled to the desired temperature.

The cooled film described above can be collected in any suitable manner. For example, the film is generally rolled by a winder, such as a surface winder, turret or center winder, or a center/surface winder.

The following examples further illustrate the subject matter described above but, of course, should not be construed as in any way limiting the scope thereof.

Example 1

The following example demonstrates the production of and properties of several thermoplastic polymer compositions according to the invention.

Several commercially available high-density polyethylene resins were tested to determine their Melt Flow Index (MFI) and the average radius of their Cole-Cole plot ($r_{avg}$). The Melt Relaxation Product (MRP) of each resin was then calculated. The results of these measurements and the calculations are set forth in Table 1 below.

The MFI of each polyethylene polymer, which is reported in units of decigrams per minute (dg/min), was measured in accordance with ASTM Standard D1238 at 190° C. using a 2.16 kg load. The average radius of the Cole-Cole plot ($r_{avg}$) was determined in accordance with the general procedure described above. In particular, the dynamic viscosity ($\eta'$) and out-of-phase viscosity ($\eta''$) were measured using a TA Instruments ARES G2 rotational rheometer equipped with 25-mm parallel plates which were set at 1.1 mm gap. A compression molded disk of the polymer was placed on the bottom plate of the rheometer and allowed to melt at the measurement temperature of 140° C. The top and bottom plates were then set at the desired 1.1 mm gap and any excess molten polymer protruding beyond the disk perimeter was trimmed. Measurements of the viscosity were then taken at angular frequencies of approximately 0.147, 0.216, 0.317, 0.467, 0.683, 1.003, 1.472, 2.160, 3.171, 4.655, 6.832, 10.028, 14.719, 21.604, 31.711, 46.545, 68.319, 100.279, and 147.198 rad/s. These measurements yielded dynamic viscosity ($\eta'$) and out-of-phase viscosity ($\eta''$) values (among the outputs typically available in modern rheometers) that were then plotted to generate a Cole-Cole plot with the dynamic viscosity ($\eta'$) as the x axis and the out-of-phase viscosity ($\eta''$) as the y axis.

To determine the average radius of the Cole-Cole plot for each resin, the measured data were fit to the following cartesian equation for a circle using the least squares approach:

$$r^2 = (x-h)^2 + (y-k)^2.$$

In the equation above, x corresponds to the dynamic viscosity ($\eta'$) value, and y corresponds to the out-of-phase viscosity ($\eta''$) value. The variables h and k represent the offset of the center of the circle from the origin of the Cole-Cole plot. Due to the nature of the complex viscosity, the value of h is a positive number, and the value of k is a negative number. The actual fit of the data was performed using Microsoft® Excel™ with the solver add-in installed. Columns were built with equations for individual r, individual y, individual x, and square of the error (SE) at each (x,y) pair generated at each strain rate. Then, the sum of the squared errors (SSE) was located in the workbook cell set as the "Set Objective:" field to Minimize, while constants h and k were located in the workbook cells in the "By Changing Variable Cells:" field. To avoid possible local minima, GRG Nonlinear was set to "Use Multi-Start." The boundary for h was set to greater than zero but less than some number larger than the largest expected h value. The boundary for k was set to less than zero but greater than some large negative number well more negative than the expected k values. After the fit was run and the SSE was minimized, the radius values for each x,y pair of the Cole-Cole plot were averaged, and the resulting value was reported as the average radius of the Cole-Cole plot ($r_{avg}$) for the polymer.

TABLE 1

Density, Melt Flow Index, average radius of the Cole-Cole plot ($r_{avg}$), and Melt Relaxation Product values for several commercial HDPE polymers.

| HDPE Polymer | density (kg/m³) | MFI (dg/min) | $r_{avg}$ | Melt Relaxation Product (MRP) |
|---|---|---|---|---|
| Dow DMDA-8904 | 952 | 4.4 | 7,550 | 33,200 |
| Nova Sclair 2607 | 947 | 4.8 | 5,280 | 25,300 |
| Nova Sclair 2807 | 954 | 6.7 | 4,530 | 30,400 |
| Dow DMDA-8007 | 965 | 8.3 | 2,980 | 24,700 |
| ExxonMobil HD 6719.17 | 952 | 19 | 1,320 | 25,100 |
| Dowlex IP 40 | 952 | 40 | 1,400 | 56,000 |

Several polymer compositions were made with the aforementioned HDPE polymers to investigate the relationship between the Melt Relaxation Product of a polymer and the nucleation efficiency of the bicyclo[2.2.1]heptane-2,3-dicarboxylate salt. To facilitate mixing the bicyclo[2.2.1]heptane-2,3-dicarboxylate salt with each HDPE polymer, a masterbatch was produced by combining 240.0 g of calcium bicyclo[2.2.1]heptane-2,3-dicarboxylate, 120.0 g of zinc stearate, 90 g of DHT-4V, 0.90 g of Irganox 1010, 2.1 g of Irgafos 168, and 5547.0 g of Nova Sclair 2908 HDPE polymer. The mixture was transferred to and mixed in a 30-liter Henschel high intensity mixer for 3.0 minutes at 1200 rpm. The resulting mixture was then compounded using a Leistritz 27-mm corotating twin screw extruder at 18 kg/hr with a screw speed of 400 rpm, the first zone set to 100° C., and other zones ranging from 165-175° C. The resulting masterbatch, which contained four percent by weight calcium bicyclo[2.2.1]heptane-2,3-dicarboxylate, will hereafter be referred to as "Masterbatch 1."

The polymer compositions containing the bicyclo[2.2.1]heptane-2,3-dicarboxylate salt were prepared by twin screw compounding/pelletizing a dry blend of Masterbatch 1 and the HDPE polymer on a Leistritz 18-mm corotating twin screw extruder at 3.5 kg/hr using a screw speed of approximately 500 rpm. The first zone was set to 160° C. with following zones varying between 145-155° C.

Portions of the non-nucleated HDPE polymer and the nucleated HDPE polymer were then molded into shrinkage plaques (2.0 mm×60.0 mm×60.0 mm) according to ISO 294 with a 55-ton Arburg injection molding unit and dual cavity mold. Shrinkage measurements on the plaques were taken in accordance with ISO 294. The results of the shrinkage measurements are set forth in Table 2 below.

TABLE 2

Transverse direction (TD) shrinkage results for Samples 1-16.

| Sample | HDPE Resin | Nucleator (ppm) | MFI (dg/min) | MRP | % TD Shrinkage |
|---|---|---|---|---|---|
| 1 | DMDA-8007 | 0 | 8.3 | 24,700 | 1.60 |
| 2 | DMDA-8007 | 200 | | | 0.37 |
| 3 | DMDA-8007 | 300 | | | 0.34 |
| 4 | DMDA-8007 | 600 | | | 0.29 |
| 5 | DMDA-8007 | 900 | | | 0.27 |
| 6 | DMDA-8007 | 1200 | | | 0.26 |
| 7 | Sclair 2807 | 0 | 6.7 | 30,400 | 1.49 |
| 8 | Sclair 2807 | 900 | | | 0.26 |
| 9 | DMDA-8904 | 0 | 4.4 | 33,200 | 1.78 |
| 10 | DMDA-8904 | 900 | | | 0.22 |
| 11 | Sclair 2607 | 0 | 4.8 | 25,300 | 1.61 |
| 12 | Sclair 2607 | 900 | | | 0.18 |
| 13 | HD 6719.17 | 0 | 19 | 25,100 | 1.65 |
| 14 | HD 6719.17 | 900 | | | 0.51 |
| 15 | Dowlex IP 40 | 0 | 40 | 56,000 | 1.54 |
| 16 | Dowlex IP 40 | 800 | | | 0.82 |

For the bicyclo[2.2.1]heptane-2,3-dicarboxylate salt used as the nucleating agent in these samples, low transverse direction shrinkage compared to the control, non-nucleated polymer is an indicator of good nucleation efficiency of the polymer. As can be seen from the data in Table 2, the calcium bicyclo[2.2.1]heptane-2,3-dicarboxylate was able to nucleate all of the HDPE polymers as evidenced by the reduction in transverse direction shrinkage. However, the reduction in shrinkage for Sample 16 was much lower than the reduction observed for Samples 2-6, 8, 10, 12, and 14. This data shows that the calcium bicyclo[2.2.1]heptane-2,3-dicarboxylate was not able to nucleate this particular HDPE polymer (i.e., the Dowlex IP 40 used in Sample 16) as well as the other HDPE polymers. As shown in Tables 1 and 2, the Dowlex IP 40 polymer used in making Sample 16 has an MRP greater than 50,000, whereas the polymers used in making Samples 2-6, 8, 10, 12, and 14 had MRP less than 50,000 (e.g., less than 35,000).

Portions of the non-nucleated HDPE polymer and the nucleated HDPE polymer were also molded into barrier plaques with an end-gate square mold with dimensions of 1.0-mm thick×4.0-inch (101.6 mm) width×4.0-inch (101.6 mm) breadth on a Husky 90-ton injection molding unit. Extruder zones from feed to end were 230/250/230° C., nozzle 250° C., and mold coolant 45° C. Injection linear velocity was 60 mm/second. Total cycle time was 19.7 seconds, with cooling time of 10.0 seconds, and pressure of 900 psi. Water vapor transmission rate (WVTR) measurements on the resulting barrier plaques were taken in accordance with ASTM F 1249, with the results normalized to thickness (yielded nWVTR). Conventional oxygen transmission rate (OTR) measurements were also taken on some plaques in accordance with ASTM D 3985 (dry, 23° C.), but with house low dew point air rather than 100% oxygen insult. The measurements were taken with an Illinois Instruments Model 8001 oxygen permeation analyzer. The initial OTR measurements were normalized to thickness. The normalized OTR (nOTR) are reported in units of cc*mil/m$^2$/24-hr/0.209 atm O2. The results of the nWVTR and nOTR measurements are set forth in Table 3 below.

the Dowlex IP 40 used in Sample 16 as well as the other HDPE polymers. As noted above, the Dowlex IP 40 polymer used in making Sample 16 has an MRP greater than 50,000, whereas the polymers used in making Samples 2-6, 8, 10, 12, and 14 had MRP less than 50,000 (less than 35,000).

Decreases in transverse direction shrinkage and WVTR are directly related to nucleation of the polyethylene polymer composition by the bicyclo[2.2.1]heptane-2,3-dicarboxylate salt. Thus, the differences between these two groups' results show that the bicyclo[2.2.1]heptane-2,3-dicarboxylate salt is more effective at nucleating those polymers and polymer blends with a Melt Relaxation Product of 50,000 or less. This is surprising because nothing known in the art suggests that nucleation with a bicyclo[2.2.1]heptane-2,3-dicarboxylate salt is dependent upon these polymer characteristics. However, as explained above, the inventors believe this difference is due to the lower degree of melt relaxation exhibited by polymers having a Melt Relaxation Product greater than 50,000. In such polymers, the polymer melt relaxes slowly, resulting in appreciable amounts of strain-induced, self-nucleation rather than nucleation by the bicyclo[2.2.1]heptane-2,3-dicarboxylate salt.

Example 2

The following example demonstrates the production of and properties of several thermoplastic polymer compositions.

Several polymer compositions were made by mixing various amounts of Dow Unival® DMDH-6400 NT 7 HDPE polymer with the ExxonMobil HD 6719.17 HDPE polymer

TABLE 3

Normalized water vapor transmission rates (nWVTR), percent change in nWVTR (% Δ), normalized oxygen transmission rates (nOTR), and percent change in nOTR (% Δ) for Samples 1-16.

| Sample | HDPE Resin | Nucleator (ppm) | MFI (dg/min) | MRP | nWVTR | % Δ | nOTR (0.209 atm) | % Δ |
|---|---|---|---|---|---|---|---|---|
| 1 | DMDA-8007 | 0 | 8.3 | 24,700 | 4.61 | | 359 | |
| 2 | DMDA-8007 | 200 | | | 2.76 | −40 | 212 | −41 |
| 3 | DMDA-8007 | 300 | | | 2.61 | −43 | 161 | −55 |
| 4 | DMDA-8007 | 600 | | | 2.49 | −46 | 147 | −59 |
| 5 | DMDA-8007 | 900 | | | 2.33 | −49 | 144 | −60 |
| 6 | DMDA-8007 | 1200 | | | 2.33 | −49 | 141 | −61 |
| 7 | Sclair 2807 | 0 | 6.7 | 30,400 | 5.80 | | | |
| 8 | Sclair 2807 | 900 | | | 2.91 | −50 | | |
| 9 | DMDA-8904 | 0 | 4.4 | 33,200 | 5.90 | | | |
| 10 | DMDA-8904 | 900 | | | 3.53 | −40 | | |
| 11 | Sclair 2607 | 0 | 4.8 | 25,300 | 6.72 | | 532 | |
| 12 | Sclair 2607 | 900 | | | 3.42 | −49 | 235 | −56 |
| 13 | HD 6719.17 | 0 | 19 | 25,100 | 5.55 | | 426 | |
| 14 | HD 6719.17 | 900 | | | 3.08 | −45 | 209 | −51 |
| 15 | Dowlex IP 40 | 0 | 40 | 56,000 | 4.49 | | | |
| 16 | Dowlex IP 40 | 800 | | | 3.76 | −16 | | |

The data in Table 3 show that the calcium bicyclo[2.2.1]heptane-2,3-dicarboxylate was able to nucleate all of the HDPE polymers as evidenced by a measured reduction in nWVTR. However, the reduction in nWVTR for Sample 16 was much lower than the reduction observed for Samples 2-6, 8, 10, 12, and 14. Indeed, the reduction for Sample 16 was only about one third of the reduction observed for the other samples. This data shows that the calcium bicyclo[2.2.1]heptane-2,3-dicarboxylate was not able to nucleate used in Example 1. Non-nucleated controls were made by mixing the desired amounts of DMDH-6400 polymer and HD 6719.17 polymer with 2% of Sclair 2908 HDPE resin (the carrier used in making the masterbatch described in Example 1). Nucleated samples were made by mixing the desired amounts of DMDH-6400 polymer and HD 6719.17 polymer with 2% of Masterbatch 1 described in Example 1. The percentages of DMDH-6400 polymer and HD 6719.17 polymer in each sample are set forth in Table 4 below. The polymer blends were compounded with a Leistritz 18-mm corotating twin screw extruder at a screw speed of 500 rpm, a feed rate of 4.0 kg/hr, and barrel temperature setpoints ranging from 155-165° C.

Each polymer composition was molded into barrier plaques as described in Example 1. The normalized oxygen transmission rate (nOTR) for each plaque was also measured as described in Example 1. The results of these measurements are set forth in Table 4 below.

TABLE 4

Melt Flow Index (MFI), average radius of the Cole-Cole plot ($r_{avg}$), Melt Relaxation Product (MRP), and normalized oxygen transmission rates (nOTR), and percent change in nOTR (Δ %) for Samples 17-22.

| Sample | Polymers (%) | Nucleator (ppm) | MFI (dg/min) | $r_{avg}$ | MRP | nOTR 0.209 atm | % Δ |
|---|---|---|---|---|---|---|---|
| 17 | DMDH-6400 (30) HD 6719.17 (68) Sclair 2908 (2) | 0 | 8.1 | 21,950 | 177,800 | 409 | |
| 18 | DMDH-6400 (30) HD 6719.17 (68) MB Ex. 19 (2) | 800 | | | | 307 | −25 |
| 19 | DMDH-6400 (20) HD 6719.17 (78) Sclair 2908 (2) | 0 | 10.0 | 11,810 | 118,100 | 361 | |
| 20 | DMDH-6400 (20) HD 6719.17 (78) MB Ex. 19 (2) | 800 | | | | 275 | −24 |
| 21 | DMDH-6400 (10) HD 6719.17 (88) Sclair 2908 (2) | 0 | 14.1 | 4,670 | 65,800 | 351 | |
| 22 | DMDH-6400 (10) HD 6719.17 (88) MB Ex. 19 (2) | 800 | | | | 260 | −26 |

As can be seen from the data in Table 4, the reductions in nOTR are relatively modest for all of the polymer blends. Indeed, the reductions in nOTR observed for Samples 18, 20, and 22 were only about half of the reductions observed for Samples 2-6, 12, and 14 from Example 1. Further, the data in Table 4 show that Samples 17-22 had MRP significantly higher than 50,000. These high MRP values are indicative of insufficient melt relaxation in the polymer, which, as noted above, impedes nucleation of the polymer by the bicyclo[2.2.1]heptane-2,3-dicarboxylate salt.

Example 3

The following example demonstrates the production of and properties of several thermoplastic polymer compositions.

Several polymer compositions were made using the HD 6719.17 HDPE polymer described above. The polymer compositions were made by compounding the HDPE polymer with increasing amounts of peroxide, specifically 2,5-dimethyl-2,5-di-(t-butylperoxy)hexane (Varox® DBPH). It is generally accepted that treating a copolymer HDPE polymer with peroxide will increase long chain branching (LCB), with an understanding that some short chain branching (SCB) could also occur. The branching contributes to at least some molecular weight increase (and MI decrease), and typically at least some broadening of molecular weight distribution. Both of these effects should increase the average radius of the Cole-Cole plot, which should also increase the Melt Relaxation Product (MRP). Thus, this series of experiments explores the effect of increasing the MRP for a given polyethylene polymer composition.

The polymer compositions were produced by adding the desired amount of peroxide (DBPH) to 4 kg of HD 6719.17 powder that had been ground from the commercially available pellets in an attrition mill. In particular, the polymer powder was charged into a Hobart mixer and mixing was started. The DBPH, which is a liquid at room temperature, was slowly added dropwise until the desired amount of DBPH was added and mixing continued for five minutes. The resulting mixture was then extruded and pelletized with a Deltaplast single screw extruder (one inch (2.54 cm) diameter, L/D 30, Maddock mixing section, flat barrel profile of 210° C.) interfaced to a strand pelletizer. A screen pack stack to include 150 mesh was also used to raise back pressure and cause more slippage/mixing in the extruder, thereby ensuring that the peroxide was thoroughly incorporated into the polymer. The collected pellets were tumble blended to more fully homogenize the sample before further processing. The amount of peroxide (DBPH) and calcium bicyclo[2.2.1]heptane-2,3-dicarboxylate used in making each polymer composition is set forth in Table 5 below.

Portions of the resulting pelletized polymer compositions were molded into barrier plaques as described in Example 1. Other portions of the compositions were dry blended with 2.2% of Masterbatch 1 described in Example 1 to give nucleated compositions containing 880 ppm nucleator, and the resulting nucleated compositions were also molded into barrier plaques as in Example 1. The barrier plaques were then analyzed to determine normalized oxygen transmission rates (nOTR) using the procedure described in Example 1. The results of these analyses are set forth in Table 5 below.

TABLE 5

DBPH concentration, nucleator concentration, Melt Flow Index (MFI), average radius of the Cole-Cole Plot ($r_{avg}$), Melt Relaxation Product (MRP), normalized oxygen transmission rate (nOTR), and percent change in nOTR (% Δ) for Samples 23-34.

| Sample | DBPH (ppm) | Nucleator (ppm) | MFI (dg/min) | $r_{avg}$ | MRP | nOTR 0.209 atm | % Δ |
|---|---|---|---|---|---|---|---|
| 23 | 60 | 0 | 16.6 | 1,900 | 31,500 | 447 | |
| 24 | 60 | 880 | | | | 248 | −45 |

TABLE 5-continued

DBPH concentration, nucleator concentration, Melt Flow Index (MFI), average radius of the Cole-Cole Plot ($r_{avg}$), Melt Relaxation Product (MRP), normalized oxygen transmission rate (nOTR), and percent change in nOTR (% Δ) for Samples 23-34.

| Sample | DBPH (ppm) | Nucleator (ppm) | MFI (dg/min) | $r_{avg}$ | MRP | nOTR 0.209 atm | % Δ |
|---|---|---|---|---|---|---|---|
| 25 | 100 | 0 | 15.4 | 2,230 | 34,300 | 442 | |
| 26 | 100 | 880 | | | | 239 | −46 |
| 27 | 160 | 0 | 13.5 | 2,770 | 37,400 | 431 | |
| 28 | 160 | 880 | | | | 247 | −43 |
| 29 | 220 | 0 | 10.4 | 3,740 | 38,900 | 434 | |
| 30 | 220 | 880 | | | | 245 | −44 |
| 31 | 280 | 0 | 8.6 | 4,900 | 42,100 | 423 | |
| 32 | 280 | 880 | | | | 243 | −43 |
| 33 | 340 | 0 | 7.1 | 6,320 | 44,900 | 413 | |
| 34 | 340 | 880 | | | | 257 | −38 |

The data in Table 5 show that increasing amounts of peroxide resulted in a decrease in the melt flow index (MFI) and an increase in the average radius of the Cole-Cole plot ($r_{avg}$). The increase in $r_{avg}$ was of greater magnitude than the decrease in MFI, which resulted in an increase in the Melt Relaxation Product (MRP). An examination of the nOTR data for Samples 24, 26, 28, 30, 32, and 34 shows that the magnitude of the decrease in nOTR relative to the non-nucleated control generally decreases as the MRP increases. However, even at an MRP of 44,900, Sample 34 still showed a 38% decrease in nOTR relative to the control, which indicates that this polymer still exhibited sufficient melt relaxation for nucleation by the bicyclo[2.2.1]heptane-2,3-dicarboxylate salt to predominate over any strain-induced, self-nucleation.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A thermoplastic polymer composition comprising:
   (a) a polyethylene polymer composition having a Melt Relaxation Product of 50,000 or less; and
   (b) calcium bicyclo[2.2.1]heptane-2,3-dicarboxylate.

2. The thermoplastic polymer composition of claim 1, wherein the polyethylene polymer composition has a Melt Relaxation Product of 45,000 or less.

3. The thermoplastic polymer composition of claim 1, wherein the polyethylene polymer composition has a Melt Flow Index at 190° C. of about 1 dg/min to about 80 dg/min.

4. The thermoplastic polymer composition of claim 1, wherein the calcium bicyclo[2.2.1]heptane-2,3-dicarboxylate is a salt of cis-endo-bicyclo[2.2.1]heptane-2,3-dicarboxylic acid.

5. The thermoplastic polymer composition of claim 1, wherein the thermoplastic polymer composition contains about 100 ppm to about 3,000 ppm of the calcium bicyclo[2.2.1]heptane-2,3-dicarboxylate.

6. The thermoplastic polymer composition of claim 1, wherein the thermoplastic polymer composition further comprises an acid scavenger selected from the group consisting of salts of $C_{12}$-$C_{22}$ fatty acids, hydrotalcite compounds, and mixtures thereof.

7. The thermoplastic polymer composition of claim 6, wherein the thermoplastic polymer composition contains about 100 ppm to about 3,000 ppm of the salt of the acid scavenger.

8. A method for producing an injection molded article, the method comprising the steps of:
   (a) providing a thermoplastic polymer composition comprising (i) a polyethylene polymer composition having a Melt Relaxation Product of 50,000 or less; and (ii) calcium bicyclo[2.2.1]heptane-2,3-dicarboxylate;
   (b) heating the thermoplastic polymer composition to a temperature sufficient to melt the thermoplastic polymer composition so that it may be injected into a mold, the mold having a mold cavity defining the dimensions of an article;
   (c) injecting the molten thermoplastic polymer composition into the mold cavity;
   (d) allowing the molten thermoplastic polymer composition in the mold cavity to cool and solidify thereby forming an injection molded article; and
   (e) opening the mold and ejecting the article from the mold cavity.

9. The method of claim 8, wherein the polyethylene polymer composition has a Melt Relaxation Product of 45,000 or less.

10. The method of claim 8, wherein the polyethylene polymer composition has a Melt Flow Index at 190° C. of about 1 dg/min to about 80 dg/min.

11. The method of claim 8, wherein the calcium bicyclo[2.2.1]heptane-2,3-dicarboxylate is a salt of cis-endo-bicyclo[2.2.1]heptane-2,3-dicarboxylic acid.

12. The method of claim 8, wherein the thermoplastic polymer composition contains about 100 ppm to about 3,000 ppm of the calcium bicyclo[2.2.1]heptane-2,3-dicarboxylate.

13. The method of claim 8, wherein the thermoplastic polymer composition further comprises an acid scavenger selected from the group consisting of salts of $C_{12}$-$C_{22}$ fatty acids, hydrotalcite compounds, and mixtures thereof.

14. The method of claim 13, wherein the polymer composition contains about 100 ppm to about 3,000 ppm of the salt of the acid scavenger.

15. A method for producing a film, the method comprising the steps of:
  (a) providing a thermoplastic polymer composition comprising (i) a polyethylene polymer composition having a Melt Relaxation Produce of 50,000 or less; and (ii) calcium bicyclo[2.2.1]heptane-2,3-dicarboxylate;
  (b) heating the thermoplastic polymer composition to a temperature sufficient to melt the thermoplastic polymer composition so that it may be extruded through a die;
  (c) extruding the molten thermoplastic polymer composition through a die having a slot-shaped die orifice to form a film exiting the die orifice;
  (d) passing the film exiting the die orifice over a cooled surface to solidify the thermoplastic polymer composition; and
  (e) collecting the film.

16. The method of claim 15, wherein the polyethylene polymer composition has a Melt Relaxation Product of 45,000 or less.

17. The method of claim 15, wherein the polyethylene polymer composition has a Melt Flow Index at 190° C. of about 1 dg/min to about 80 dg/min.

18. The method of claim 15, wherein the thermoplastic polymer composition comprises calcium bicyclo[2.2.1]heptane-2,3-dicarboxylate is a salt of cis-endo-bicyclo[2.2.1] heptane-2,3-dicarboxylic acid.

19. The method of claim 15, wherein the thermoplastic polymer composition contains about 100 ppm to about 3,000 ppm of the calcium bicyclo[2.2.1]heptane-2,3-dicarboxylate.

20. The method of claim 15, wherein the thermoplastic polymer composition further comprises an acid scavenger selected from the group consisting of salts of $C_{12}$-$C_{22}$ fatty acids, hydrotalcite compounds, and mixtures thereof.

21. The method of claim 20, wherein the polymer composition contains about 100 ppm to about 3,000 ppm of the salt of the acid scavenger.

\* \* \* \* \*

UNITED STATES PATENT AND TRADEMARK OFFICE
CERTIFICATE OF CORRECTION

| | |
|---|---|
| PATENT NO. | : 11,891,495 B2 |
| APPLICATION NO. | : 17/386675 |
| DATED | : February 6, 2024 |
| INVENTOR(S) | : Walter Forrister, Xiaoyou Xu and Darin Dotson |

It is certified that error appears in the above-identified patent and that said Letters Patent is hereby corrected as shown below:

In the Claims

Claim 15, Column 23, Line 17, replace "Produce" with "Product"

Claim 18, Column 24, Line 11, after "wherein the" delete "thermoplastic polymer composition comprises"

Signed and Sealed this
Twenty-sixth Day of March, 2024

Katherine Kelly Vidal
*Director of the United States Patent and Trademark Office*